United States Patent
Jung et al.

(10) Patent No.: US 9,780,668 B2
(45) Date of Patent: Oct. 3, 2017

(54) ELECTRONIC APPARATUS, POWER SUPPLY AND POWER CONTROL METHOD THEREOF

(71) Applicant: SAMSUNG ELECTRONICS CO., LTD., Suwon-si (KR)

(72) Inventors: Sung-Bum Jung, Yongin-si (KR); Jin-Hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 14/804,537

(22) Filed: Jul. 21, 2015

(65) Prior Publication Data
US 2016/0028317 A1  Jan. 28, 2016

(30) Foreign Application Priority Data
Jul. 22, 2014  (KR) .................. 10-2014-0092387

(51) Int. Cl.
*H02M 1/36* (2007.01)
*H02M 3/335* (2006.01)
*H02M 1/00* (2006.01)

(52) U.S. Cl.
CPC .......... *H02M 3/33507* (2013.01); *H02M 2001/0032* (2013.01); *Y02B 70/16* (2013.01)

(58) Field of Classification Search
CPC ..... H02M 3/33507; H02M 2001/0041; H02M 3/33523; H02M 2001/006; H02M 1/136
USPC ........ 363/16–20, 21.01, 21.04, 21.06, 21.08, 363/21.11–16, 34–44, 49, 97
See application file for complete search history.

(56) References Cited

U.S. PATENT DOCUMENTS

| | | | | |
|---|---|---|---|---|
| 5,508,602 A * | 4/1996 | Borgato | ............... | H02M 3/156 323/222 |
| 5,640,317 A * | 6/1997 | Lei | ........................ | H02M 1/36 363/49 |
| 5,929,614 A * | 7/1999 | Copple | ................. | H02M 3/155 323/222 |
| 5,978,235 A * | 11/1999 | Lampinen | .......... | H02M 3/3385 363/21.16 |
| 6,333,862 B1 * | 12/2001 | Lee | ................... | H02M 3/33507 363/21.01 |
| 6,775,164 B2 * | 8/2004 | Wong | .................... | H02M 3/156 363/147 |
| 8,787,046 B2 * | 7/2014 | Hsieh | ................ | H02M 3/33523 363/21.08 |
| 2012/0314459 A1 | 12/2012 | Park et al. | | |
| 2013/0088898 A1 | 4/2013 | Gao et al. | | |

* cited by examiner

*Primary Examiner* — Rajnikant Patel
(74) *Attorney, Agent, or Firm* — Sughrue Mion, PLLC (57) ABSTRACT

A power supply configured to include a switch which performs a switching operation in accordance with a preset period in a standby mode, a transformer which supplies voltage from a primary side to a secondary side in response to the switching operation of the switch, and a constant-voltage controller which controls voltage supplied to the system by regulating the voltage at the secondary side of the transformer, the constant-voltage controller including a blocking diode which shuts off current flowing from an output of the power supply to the constant-voltage controller in an off-section of the switch. Thus, the power consumption is decreased in the off-section, thereby having an effect on reducing the standby power.

11 Claims, 6 Drawing Sheets

ELECTRONIC APPARATUS, POWER SUPPLY AND POWER CONTROL METHOD THEREOF

CROSS-REFERENCE TO RELATED APPLICATION

This application claims priority from Korean Patent Application No. 10-2014-0092387, filed on Jul. 22, 2014, in the Korean Intellectual Property Office, the disclosure of which is incorporated herein by reference in its entirety.

BACKGROUND

Field

Apparatuses and methods consistent with exemplary embodiments relate to controlling power consumption in a standby mode.

Description of Related Art

An electronic apparatus including a display apparatus, such as a television, may be provided with a power supply for supplying power needed for operations. The electronic apparatus may have a plurality of power modes, and may enter a standby mode, in which power supplied to some elements is shut off to decrease power consumption. For example, the power may be shut off after a predetermined time elapses without any operation.

When an electronic apparatus is in standby mode, the system may need standby power for performing the minimum operation. To accomplish this, the electronic apparatus may have a power supply (hereinafter, referred to as a 'standby power supply') for supplying power in a standby mode.

Figure 1:
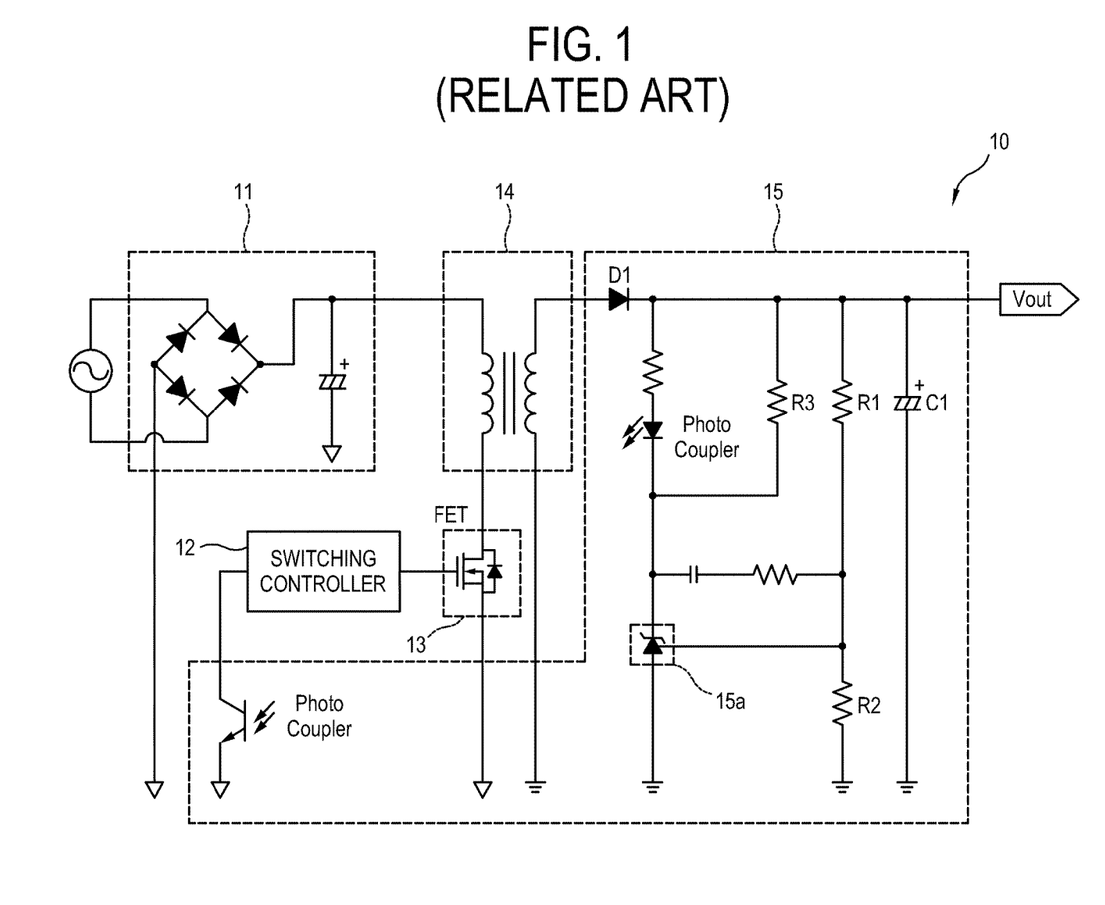
FIG. 1 is a view showing a related art power supply.

FIG. 1 is a view showing a related art power supply.

Referring to FIG. 1, a power supply 10 operates as follows.

If alternating current (AC) power is supplied, a bridge rectifier circuit 11 converts an AC into a direct current (DC). Under control of a switching controller 12, a switching element (e.g., a field effect transistor (FET) 13) performs a switching operation, and DC power is supplied from a primary side of a transformer 14 to a secondary side in response to the switching operation.

The power supplied to the secondary side of the transformer 14 is output as the DC power to the system of performing the operations of the electronic apparatus via a rectifier D1 and a smoothing capacitor C1 of a constant-current controller 15.

The power in the secondary side of the transformer 14 is controlled, i.e. regulated, by a voltage regulator 15a, a first reference resistor R1, and a second reference resistor R2, of the constant-current controller 15, and fed back to a switching controller 12 at the primary side of the transformer 14 via a photo-coupler. The voltage regulator 15a receives a bias current for operation through a bias resistor R3.

The power supply 10 of FIG. 1 may operate in a burst mode so as to decrease loss caused by a switching operation under a low load condition such as a standby condition. In the burst mode, the power supply 10 operates the switching element 13 in accordance with a preset burst period, stops the switching operation in a predetermined section (e.g., an off-section) corresponding to the burst period, and prevents power loss due to unnecessary switching operations. Here, the burst period may be previously set from milliseconds (ms) to a long period for achieving ultra-low standby power, e.g., seconds (s).

However, a related art power supply 10 may consume power by a voltage regulator 15a, first and second reference resistors R1 and R2, a bias resistor R3, etc. even in the off-section in which the switching operation is not performed. Specifically, referring to FIG. 1, voltage charged in the smoothing capacitor C1 is supplied to and consumed by the voltage regulator 15a, the first and second reference resistors R1 and R2 and the bias resistor R3 in the off-section.

Therefore, the power loss continuously occurs in the standby mode regardless of the burst operation, which causes a problem of increasing the standby power.

SUMMARY

According to an aspect of an exemplary embodiment, there is provided an electronic apparatus including: a power supply including: a switch configured to perform a switching operation in accordance with a preset period; a transformer configured to supply a voltage from a primary side of the transformer to a secondary side of the transformer in response to the switching operation; and a constant-voltage controller configured to control a voltage supplied to the electronic apparatus by regulating the voltage at the secondary side of the transformer, wherein the constant-voltage controller includes a blocking diode configured to block current flowing from an output of the power supply to the constant-voltage controller in an off state of the switch. Thus, it is possible to reduce power consumption due to elements of the constant-voltage controller in the off state.

The constant-voltage controller may be configured to feedback the voltage at the secondary side of the transformer to the primary side of the transformer in an on state of the switch. Thus, it is possible to apply feedback control to the voltage at the output terminal of the power supply.

The constant-voltage controller may include a voltage regulator configured to regulate the voltage at the secondary side of the transformer, a first reference resistor and a second reference resistor configured to compare voltages of the voltage regulator, a bias resistor configured to apply current to the voltage regulator, a photo-coupler configured to supply the voltage regulated by the voltage regulator to the primary side of the transformer, and a first smoothing capacitor configured to be charged with the voltage supplied to the system, and the blocking diode may be configured to block the voltage charged in the first smoothing capacitor from being provided to the voltage regulator, the first reference resistor, the second reference resistor, the bias resistor, and the photo-coupler. Thus, it is possible to prevent the voltage charged in the first smoothing capacitor from being consumed by the first and second reference resistors and the bias resistor.

The constant-voltage controller may further include a second smoothing capacitor configured to charge a voltage supplied to the voltage regulator, the first reference resistor, the second reference resistor, the bias resistor, and the photo-coupler. Thus, it is possible to supply the minimum power for constant-voltage control.

A capacitance of the second smoothing capacitor may be smaller than a capacitance of the first smoothing capacitor. Thus, the power loss in the switching off state is minimized as much as energy stored in the second smoothing capacitor.

The second smoothing capacitor may be configured to be discharged in the off state of the switch regardless of a switching period. Thus, the switch is normally turned on/off while minimizing the power loss in the off state.

According to an aspect of another exemplary embodiment, there is provided an electronic apparatus including: a power supply including: a switch configured to perform a switching operation in accordance with a preset period, a transformer configured to supply a voltage from a primary side of the transformer to a secondary side of the transformer in response to the switching operation, and a constant-voltage controller configured to control a voltage supplied to the electronic apparatus by regulating the voltage at the secondary side of the transformer, wherein the constant-voltage controller includes a first smoothing capacitor and a second smoothing capacitor connected in sequence from an output of the power supply and configured to be charged with a voltage in an on state of the switch, and a blocking diode interposed between the first smoothing capacitor and the second smoothing capacitor and configured to block current flowing from the first smoothing capacitor to the constant-voltage controller. Thus, the power consumed by the elements of the constant-voltage controller is decreased in the switching off state.

A capacitance of the second smoothing capacitor may be smaller than a capacitance of the first smoothing capacitor. Thus, the power loss in the switching off state is minimized as much as energy stored in the second smoothing capacitor.

The second smoothing capacitor may be configured to be discharged in an off state of the switch regardless of a switching period. Thus, the switch is normally turned on/off while minimizing the power loss in the off state.

The constant-voltage controller may be configured to feedback the voltage at the secondary side of the transformer to the primary side of the transformer in the on state of the switch. Thus, it is possible to apply feedback control to the voltage at the output terminal of the power supply.

The constant-voltage controller may include a voltage regulator configured to regulate the voltage at the secondary side of the transformer, a first reference resistor and a second reference resistor configured to compare voltages of the voltage regulator, a bias resistor configured to apply current to the voltage regulator, a photo-coupler configured to supply the voltage regulated by the voltage regulator to the primary side of the transformer, and the blocking diode may be configured to block the voltage charged in the first smoothing capacitor from being provided to the voltage regulator, the first reference resistor, the second reference resistor, the bias resistor and the photo-coupler. Thus, it is possible to prevent the voltage charged in the first smoothing capacitor from being consumed by the first and second reference resistors and the bias resistor.

According to an aspect of another exemplary embodiment, there is provided a power control method of an electronic apparatus which includes a power supply configured to output power to the electronic apparatus, the method including: switching a switch of the power supply in accordance with a preset switching period; supplying a voltage from a primary side of a transformer to a secondary side of the transformer; regulating a voltage at the secondary side and outputting the regulated voltage to the electronic apparatus; and by a blocking diode, blocking current flowing from an output of the power supply to a constant-voltage controller. Thus, the power consumed by the elements of the constant-voltage controller is decreased in the switching off state.

The method may further include feeding back the regulated voltage from the secondary side of the transformer to the primary side of the transformer. Thus, it is possible to apply feedback control to the voltage at the output terminal of the power supply.

The constant-voltage controller may further include a first smoothing capacitor and a second smoothing capacitor charged with a voltage in an on-section of the switch, and wherein the blocking diode may be interposed in between the first smoothing capacitor and the second smoothing capacitor, and the blocking may include preventing the voltage charged in the first smoothing capacitor from being supplied to the constant-voltage controller. Thus, it is possible to prevent the voltage charged in the first smoothing capacitor from being consumed by the constant-voltage controller.

A capacitance of the second smoothing capacitor may be smaller than a capacitance of the first smoothing capacitor. Thus, the power loss in the switching off state is minimized as much as energy stored in the second smoothing capacitor.

The method may further include discharging the second smoothing capacitor in an off state of the switch. Thus, the switch is normally turned on/off while minimizing the power loss in the off state.

According to an aspect of another exemplary embodiment, there is provided a power supply including: a switch configured to perform a switching operation in accordance with a preset period; a transformer configured to supply a voltage from a primary side of the transformer to a secondary side of the transformer in response to the switching operation; and a constant-voltage controller configured to control a voltage supplied by regulating the voltage at the secondary side of the transformer, and feedback the voltage at the secondary side of the transformer to the primary side of the transformer, wherein the constant-voltage controller includes a first smoothing capacitor configured to be charged with the voltage in an on-section of the switch and provided in an output terminal of the power supply, and a blocking diode configured to block current flowing from the first smoothing capacitor to the constant-voltage controller in an off state of the switch. Thus, the power consumed by the elements of the constant-voltage controller is decreased in the off state.

The constant-voltage controller may further include a second smoothing capacitor in which a voltage supplied to the constant-voltage controller may be charged, and the second smoothing capacitor may be discharged in the off state of the switch regardless of a switching period. Thus, the power loss in the switching off-section is minimized as much as energy stored in the second smoothing capacitor.

The constant-voltage controller may include a voltage regulator configured to regulate the voltage at the secondary side of the transformer, a first reference resistor and a second reference resistor configured to compare voltages of the voltage regulator, a bias resistor configured to apply current to the voltage regulator, a photo-coupler configured to supply the voltage regulated by the voltage regulator to the primary side of the transformer, and the blocking diode configured to block the voltage charged in the first smoothing capacitor from being supplied to the voltage regulator, the first reference resistor, the second reference resistor, the bias resistor, and the photo-coupler. Thus, it is possible to prevent the voltage charged in the first smoothing capacitor from being consumed by the first and second reference resistors and the bias resistor.

According to an aspect of another exemplary embodiment, there is provided a method for saving power in a standby mode of an electronic apparatus, the method including: switching a switch in accordance with a preset switching period; supplying a voltage to an output of a power supply based on the switching; controlling current flowing from the output of the power supply to a constant-voltage controller with a blocking diode.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, one or more exemplary embodiments will be described in detail with reference to accompanying drawings.

Figure 2:
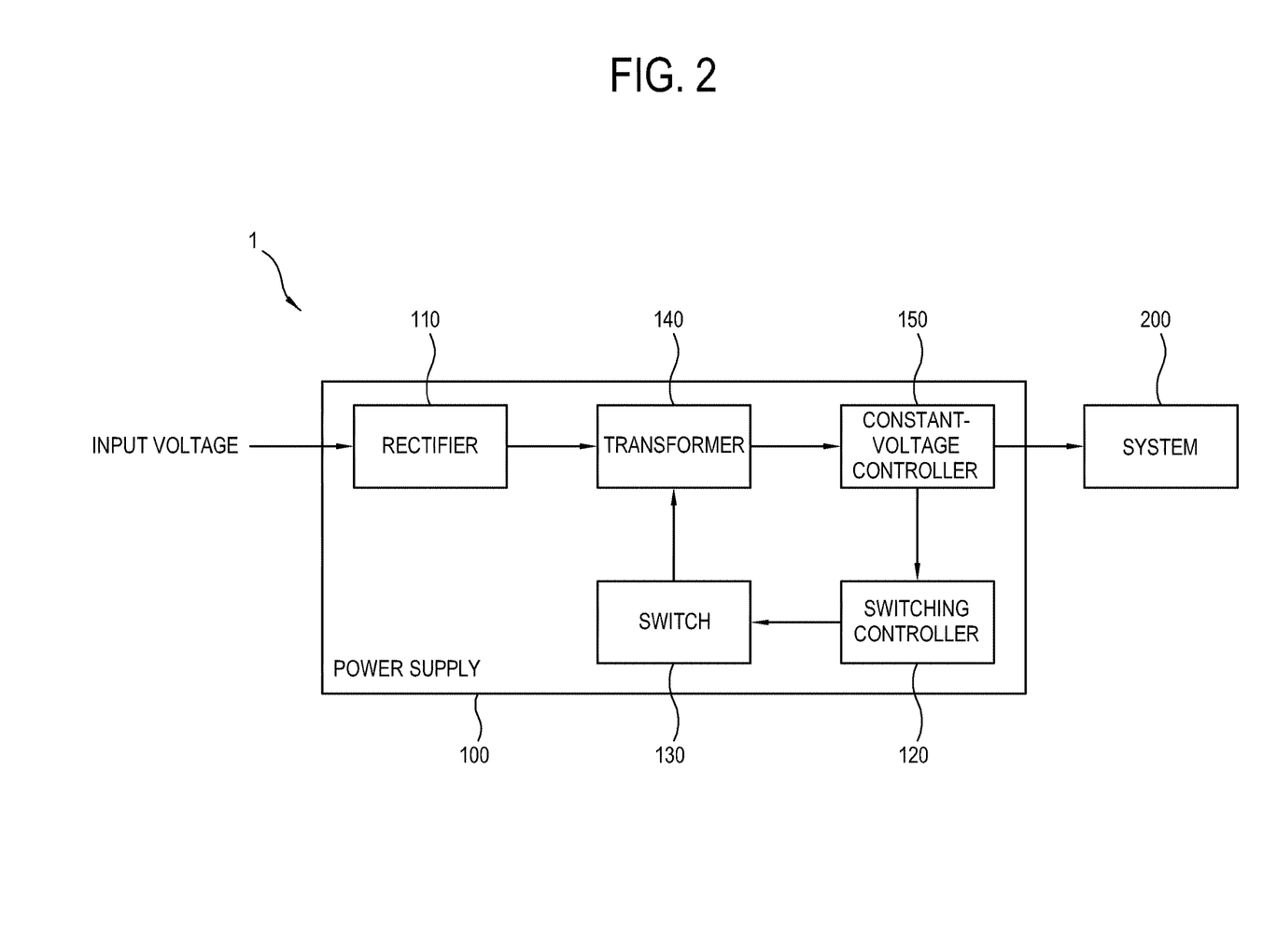
FIG. 2 is a block diagram of an electronic apparatus according to an exemplary embodiment.
Figure 3:
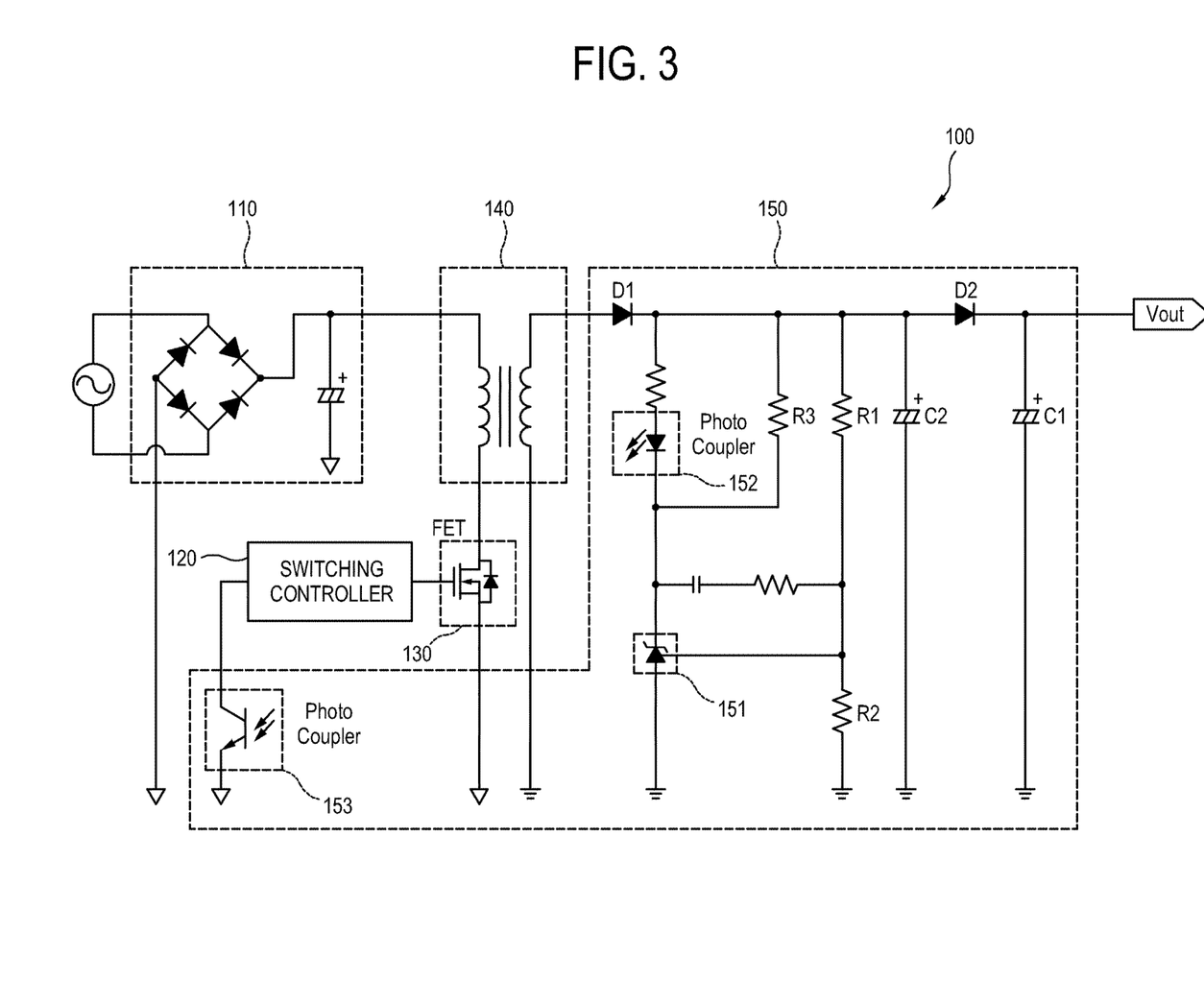
FIG. 3 is a circuit diagram of a power supply of FIG. 2 according to an exemplary embodiment.

FIG. 2 is a block diagram showing an electronic apparatus 1 according to an exemplary embodiment, and FIG. 3 is a circuit diagram of a power supply 100 in FIG. 2;

The electronic apparatus 1 may be achieved by a display apparatus such as a television (TV), a monitor, etc.; a portable terminal such as an MP3 player, a mobile phone, a tablet, etc.; a computer such as a desktop computer, a laptop computer, etc.; and so on.

As shown in FIG. 2, the electronic apparatus 1 may include a power supply 100 for supplying standby power to a system 200, and the system 200 may be used for performing operations.

The system 200 performs the operations of the electronic apparatus 1. For example, if the electronic apparatus 1 is a display apparatus, the system 200 processes an image signal received from an external image source in accordance with preset image processing and displays the processed image signal as an image. To this end, the system includes an image processor to process an image signal, a display to display the image signal as an image, a communicator to communicate with an exterior, a storage (e.g., memory) to store various pieces of data, and a central processing unit (CPU) to control the display apparatus.

The system 200 has a plurality of power modes, and thus the electronic apparatus 1 may enter a standby mode, in which power supplied to some elements is shut off, if a predetermined time elapses without operations of the system 200.

For example, if the display apparatus is in the standby mode, power may be supplied to the communicator that communicates with a remote controller to receive a user's command, or detects an input of an exterior such as a universal serial bus (USB) device. If the controller of the display apparatus detects an external input through the communicator, the system 200 is woken from the standby mode and switches over to a general power mode.

The power supply 100 may perform a portion of the functions of the power supply for supplying power to the system 200. In an exemplary embodiment, the power supply 100 may be achieved by a switching mode power supply (SMPS). Further, the power supply 100 converts AC power into DC power and outputs the DC power as standby power to the system 200 in the standby mode.

As shown in FIGS. 2 and 3, the power supply 100 includes a rectifier 110 which rectifies input AC power; a switching controller 120 which generates and outputs a control signal for a switching operation of a switch 130; the switch (e.g., a field effect transistor, FET) 130 which operates in accordance with the output of the switching controller 120; a transformer 140 which applies the DC power of a primary side to a secondary side in response to the switching operation of the switch 130; and a constant-voltage controller 150 which rectifies the DC power at the secondary side of the transformer 140 and outputs the rectified power as output power Vout to the system 200. The power Vout output from the power supply 100 to the system 200 in the standby mode is the standby power.

As shown in FIG. 2, the rectifier 110 is achieved by a bridge rectifier circuit including a plurality of diodes, and converts the input AC power into the DC power.

The switching controller 120 is achieved by an integrated circuit (IC) of a single chip, and generates a switching control signal for driving the switch 130.

The switch 130 receives the switching control signal from the switching controller 120, and performs a switching operation in accordance with a preset period.

According to an exemplary embodiment, the power supply 100 may operate in a burst mode in order to reduce power loss caused by a switching operation under a low load condition such as a standby condition. In the burst mode, the switch 130 performs the switching operation in accordance with a preset switching period, i.e., the burst period. In other words, the switch 130 thoroughly stops the switching operation in a predetermined section corresponding to the burst period (e.g., an off-section or a burst off-section), and thus prevents power consumption due to unnecessary switching operations.

The burst period may be a previously set period ranging from milliseconds (ms) to a period for achieving ultra-low standby power, e.g., seconds (s). In an exemplary embodiment, the power supply 100 may be achieved to have an off-section in which the switch 130 does not perform the switching operation for a predetermined period of time (e.g., 3 seconds, 5 seconds, etc.) so as to realize the standby power of 0.00 W (i.e. zero watt).

Figure 5:
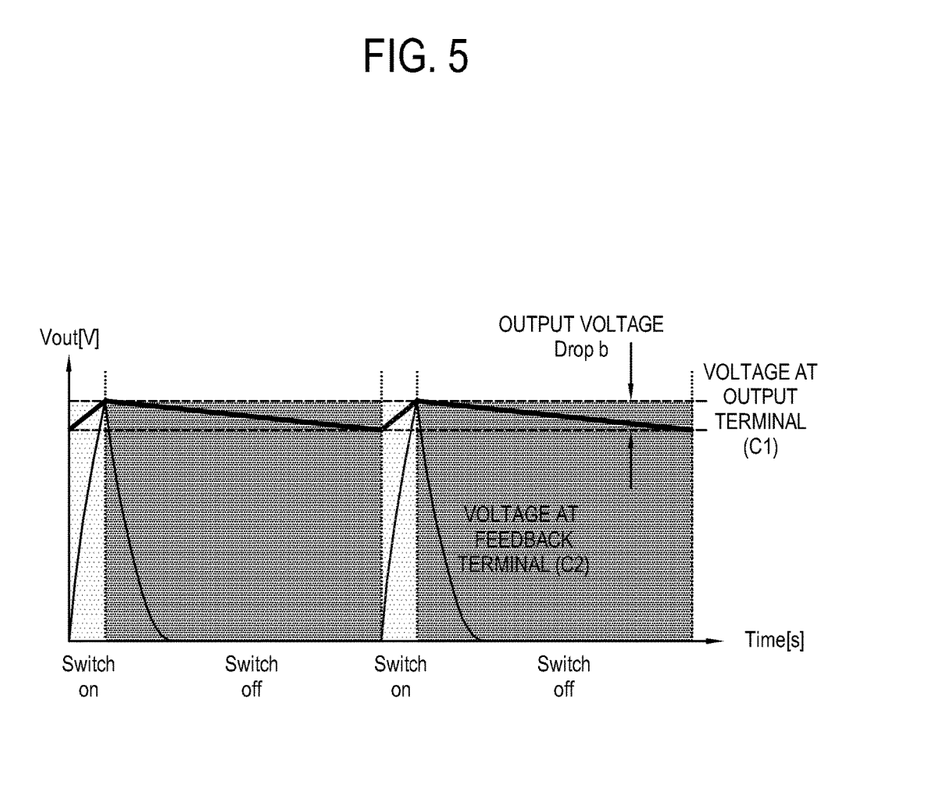
FIG. 5 is a graph showing a voltage level in a standby mode of a power supply according to an exemplary embodiment shown in FIG. 3.

The switching period of the switch 130, i.e. the burst period, may be previously set by an external input, an RC time constant, etc. The switching controller 120 generates the switching control signal corresponding to the preset switching period and outputs the generated switching control signal to the switch 130. The previously set switching period may be determined so that the output voltage Vout can be normally supplied to the system 200 as shown in FIG. 5.

The switch 130 is turned on or off in response to the switching controls signal of the switching controller 120. For example, the switching control signal may be a pulse width modulation (PWM) signal, and the switching controller 120 may be a PWM control IC to output the PWM signal in accordance with the on-section of the switch 130.

The switching controller 120 operates to turn on or off the switch 130. In the on-section of the switch 130, the DC power may be supplied to the secondary side of the transformer 140.

The switch 130 may include a switching element such as metal oxide semiconductor field effect transistor (MOS- FET), and the transformer 140 may include a transformer having windings at primary and secondary sides.

In an exemplary embodiment, the switching controller 120 may receive feedback on the secondary side power of the transformer 140 through photo-couplers 152 and 153 of the constant-voltage controller 150 as shown in FIG. 3.

As shown in FIG. 3, the constant-voltage controller 150 includes a rectifier D1 which rectifies power received through the transformer 140; a voltage regulator 151 which regulates a secondary side voltage of the transformer 140; a first reference resistor R1 and a second reference resistor R2 which are used for voltage comparison of the voltage regulator 151; a bias resistor R3 which is used for applying current to the voltage regulator 151; photo-couplers 152 and 153 which applies the voltage regulated by the voltage regulator 151 to the primary side of the transformer 140; first and second smoothing capacitors C1 and C2 connected in sequence from the output side of the power supply 100; and a blocking diode D2 interposed in between the first and second smoothing capacitor C1 and C2.

The voltage regulator 151 regulates the voltage at the second side of the transformer 140 and supplies the regulated voltage to the system 200. In an exemplary embodiment, the voltage regulator 151 is achieved by a shunt regulator such as TL431, KA431, etc., and performs constant-voltage control so that the output voltage supplied to the system 200 can be maintained at a predetermined level, e.g., 5V.

To this end, the first and second reference resistors R1 and R2 may be set to have resistance so that the voltage regulated by the voltage regulator 151 and applied to the resistor R2 can have a predetermined reference voltage, i.e. 2.5V. In an exemplary embodiment, the first and second reference resistors R1 and R2 have a resistance of 10 kΩ but it is not limited to this.

In an exemplary embodiment, the constant-voltage controller 150 is achieved by a feedback circuit of a secondary side regulation (SSR) type. With regard to the output voltage Vout generated by on/off operations of the switch 130, the constant-voltage controller 150 compares a voltage applied to the resistor R2 with a preset reference voltage. Further, the voltage regulator 151 performs regulation so that the preset reference voltage, e.g., 2.5V can be applied to the resistor R2. The regulated voltage at the secondary side of the transformer 140 is supplied as a feedback signal to the primary side through a light emitter 152 and a light receiver 153 of the photo-coupler.

In the constant-voltage controller 150 with the foregoing feedback circuit, a certain amount of power loss occurs in the first and second reference resistors R1 and R2 during the regulation using the feedback for controlling the constant voltage.

Specifically, if the output voltage Vout, i.e., the target level of the regulation, is 5V, the first reference resistor R1 has a resistance of 10 kΩ and the second reference resistor R2 has a resistance of 10 kΩ power loss $P_{loss}$ in the first and second reference resistors R1 and R2 is calculated as follows.

$$P_{loss} = \frac{(Vout)^2}{R1 + R2} = \frac{25}{20*10^{(-3)}} = 1.25 \ [mW]$$ [Expression 1]

The higher the output voltage Vout, the more the power loss.

In a related art power supply 10 shown in FIG. 1, a considerable amount of power loss $P_{loss}$ occurs in the constant-voltage controller 15 by the first and second reference resistors R1 and R2 in the off-section of the switch 13. Therefore, the power, i.e. energy corresponding to the voltage charged in the smoothing capacitor C1 during the on-section of the switch 13 is consumed by the first and second reference resistors R1 and R2 in the off-section of the switch 13.

Figure 4:
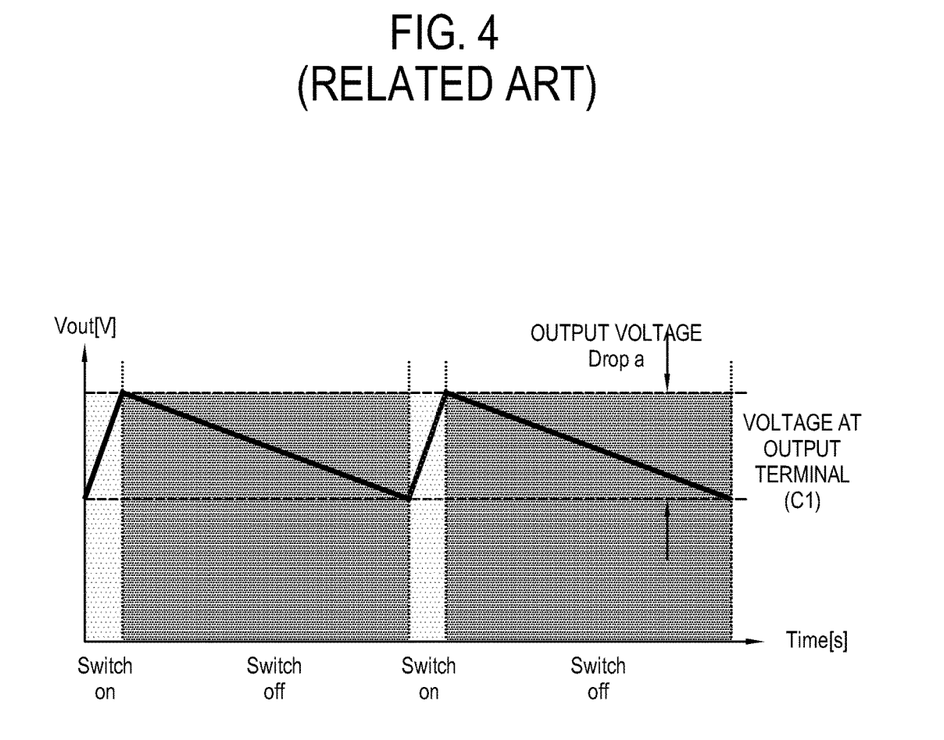
FIG. 4 is a graph showing a voltage level in the standby mode of a related art power supply shown in FIG. 1.

FIG. 4 is a graph showing a voltage level in the standby mode of a related art power supply shown in FIG. 1.

In a related art power supply 10, the switch 13 is sequentially turned on and off in accordance with the preset switching period in response to the control signal of the switching controller 12. The switching period is previously set by an external input, or the like.

As shown in FIG. 4, the voltage is supplied to the secondary side of the transformer 14 during the on-section of the switch 13, thereby increasing the output voltage Vout. Accordingly, the smoothing capacitor C1 is charged with the voltage.

Next, during the off-section in which the switch 14 does not operate, no voltage is supplied to the secondary side of the transformer 14, and thus the constant-voltage controller 15 performs voltage regulation including the feedback by the voltage charged in the smoothing capacitor C1. In this process, the output voltage Vout drops as shown in FIG. 4, and the voltage charged in the smoothing capacitor C1 is fully consumed by the first and second reference resistors R1 and R2, thereby causing the power loss. This power loss corresponds to the Drop a of the output voltage in FIG. 4.

On the other hand, according to an exemplary embodiment shown in FIG. 3, the blocking diode D2 shuts off current flowing from the output of the power supply 100 to the constant-voltage controller 150 in the off-section. In other words, the voltage charged in the first smoothing capacitor D1 is prevented from being consumed by the first and second reference resistors R1 and R2.

FIG. 5 is a graph showing a voltage level in a standby mode of the power supply according to an exemplary embodiment shown in FIG. 3.

In the power supply 100 according to an exemplary embodiment, the switch 130 is sequentially turned on and off in accordance with the preset switching period in response to the control signal of the switching controller 120. The switching period may be previously set by an external input, or the like, regardless of power fed back by the constant-voltage controller 150.

As shown in FIG. 5, voltage is supplied to the secondary side of the transformer 140 during the on-section of the switch 130, and thus the output voltage Vout increases. Accordingly, the first smoothing capacitor C1 is charged with the voltage through the blocking diode D2. Further, the second smoothing capacitor C2 is also charged with the voltage.

The capacitance of the second smoothing capacitor C2 is less than that of the first smoothing capacitor C1. Specifically, the capacitance of the second smoothing capacitor C2 is less than or equal to 1/10 of the capacitance of the first smoothing capacitor C1, so that the minimum capacitance needed for operating the constant-voltage controller 150 can be applied to the second smoothing capacitor C2.

The constant-voltage controller 150 performs the regulation using the voltage regulator 151 and the photo-couplers 152 and 153 during the on-section of the switch 130, while charging voltage in the first and second smoothing capacitors C1 and C2.

Next, in the off-section in which the switch 130 does not operate, no voltage is supplied to the secondary side of the transformer 140, and thus the constant-voltage controller 150 performs the voltage regulation including the feedback by the voltage charged in the smoothing capacitor C2. In this process, the voltage charged in the second smoothing capacitor C1 is consumed by the first and second reference resistors R1 and R2, and the like, and thus the second smoothing capacitor C2 having the small capacitance is early discharged. Accordingly, as shown in FIG. 5, the capacitor C2, i.e., the voltage feedback at the feedback terminal, is suddenly decreased in the off-section.

The voltage charged in the first smoothing capacitor C1 is shut off by the blocking diode D2 from being supplied to the constant-voltage controller 150 including the first and second reference resistors R1 and R2.

Therefore, the voltage charged in the first smoothing capacitor C1 is consumed by only the system 200 during the off-section C1. It will be appreciated that the output terminal Vout is gradually decreased. In this case, the power loss corresponds to the Drop b of the output voltage in FIG. 5.

According to an exemplary embodiment, the switch 130 of the constant-voltage controller 150 performs the switching operation to be turned on and off in accordance with the preset switching period, and therefore normally operates even though the second smoothing capacitor C2 is early discharged and no power is supplied to the voltage regulator 151 and the photo-couplers 152 and 153. That is, the second smoothing capacitor C2 may be early discharged in the off-section regardless of the switching period of the switch 130.

As described above, the voltage charged in the first smoothing capacitor C1 during the on-section of the switch 130 in the foregoing switching mode power supply 100 according to an exemplary embodiment is shut off from being supplied to the voltage regulator 151, the first and second reference resistors R1 and R2, the bias resistor R3, and the photo-couplers 152 and 153 during the off-section. Accordingly, the standby power is decreased in such a manner that the power consumed in the constant-voltage controller 150 is reduced, thereby achieving the standby power of 0.00 W (i.e. zero watt).

Below, a power control method of the electronic apparatus 1 according to an exemplary embodiment will be described with reference to the accompanying drawings.

Figure 6:
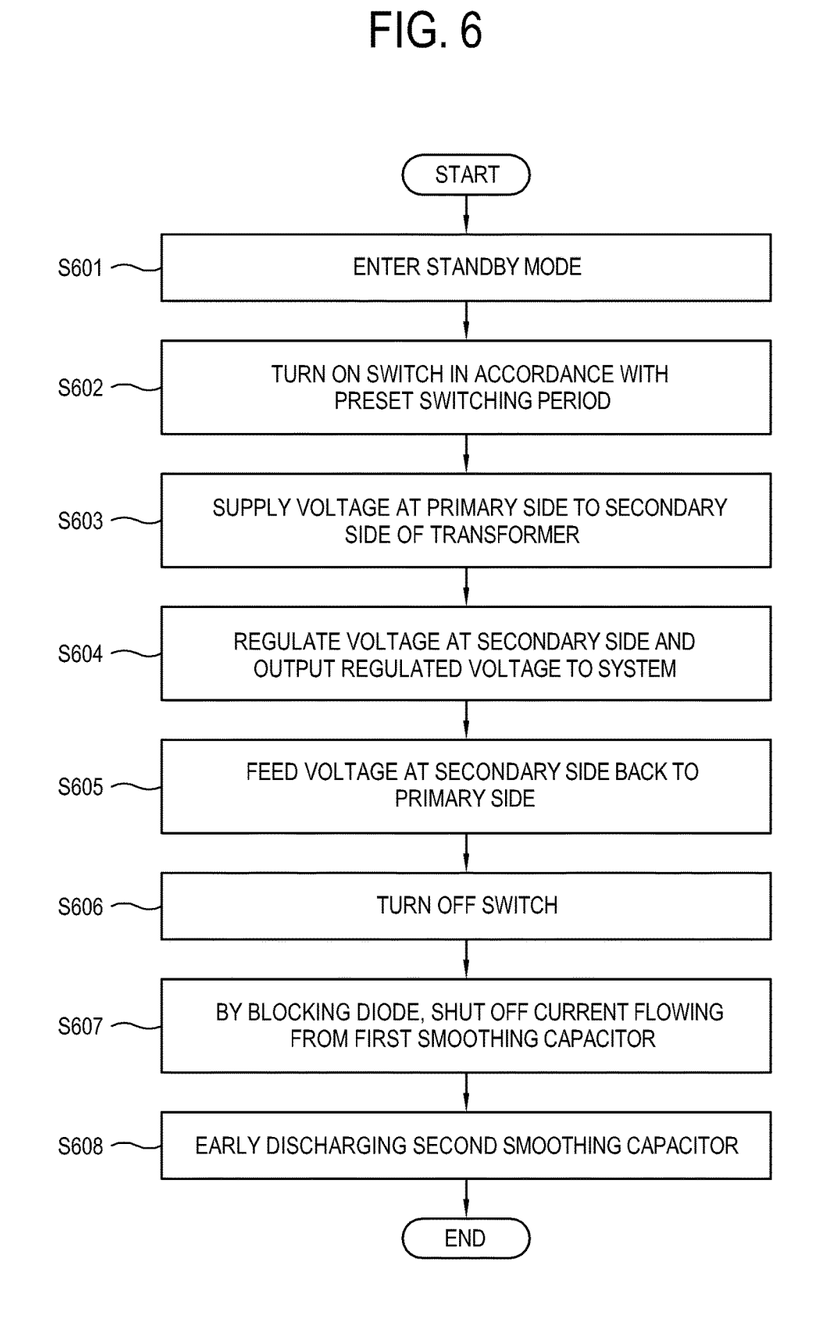
FIG. 6 is a flowchart showing a power control method of an electronic apparatus according to an exemplary embodiment.

FIG. 6 is a flowchart showing the power control method of the electronic apparatus 1 according to an exemplary embodiment.

As shown in FIG. 6, at operation S601, the electronic apparatus 1 according to an exemplary embodiment enters the standby mode to reduce power consumption if no operation is performed for a predetermined time.

After switching over to the standby mode in the operation S601, the switching controller 120 of the power supply 100 transmits the switching control signal to the switch 130, and the switch 130 is turned on at operation S602. The switch 130 performs the switching operation to be turned on and off in accordance with the preset switching period.

In response to the switching operation in the operation S602, the voltage at the primary side of the transformer 140 is supplied to the secondary side at operation S603.

The voltage regulator 151 of the constant-voltage controller 150 regulates the output voltage Vout of the power supply 100, i.e., the voltage at the secondary side of the transformer 140, supplied in the operation S603, and outputs the regulated voltage to the system 200 at operation S604. The output voltage Vout is supplied to the system 200 through the blocking diode D2, and the first and second smoothing capacitors C1 and C2 are charged with the voltage. Further, the voltage is supplied to the first and second reference resistors R1 and R2 and the bias resistor R3, and the bias resistor R3 supplies a bias current for driving the voltage regulator 151.

The voltage at the secondary side, which is regulated in the operation S604, is fed back to the switching controller 120 provided at the primary side of the transformer 140 through the photo-couplers 152 and 153 of the constant-voltage controller 150 at operation S605.

In the operations S603 and S604, with regard to the output voltage Vout, the voltage regulator 151 of the constant-voltage controller 150 compares the voltage applied to the second reference resistor R2 to the preset reference voltage, and performs the feedback control through the photo-couplers 152 and 153, thereby applying the constant-voltage control to the regulated output voltage Vout.

Next, at operation S606, the switch 130, which is turned on in the operation S602, is turned off in accordance with the preset switching period. Thus, the switch 130 does not operate, and power is not supplied from the primary side to the secondary side in the transformer 140.

If the switch 130 is turned off in the operation S606, the voltage charged in the first and second smoothing capacitors C1 and C2 in the operation S604 is supplied to the elements of the constant-voltage controller 150, and the blocking diode D2 shuts off the current flowing from the first smoothing capacitor C1 to the constant-voltage controller 150 at operation S607. Thus, the system 200 receives the power from the first smoothing capacitor C1, and the elements of the constant-voltage controller 150, i.e. the voltage regulator 151, the first and second reference resistors R1 and R2, the bias resistor R3 and the photo-couplers 152 and 153 receive the power from the second smoothing capacitor C2.

Further, the second smoothing capacitor C2 having a low capacitance (e.g., equal to or lower than ⅒ of the capacitance of the first smoothing capacitor C1) is early discharged at operation S608. That is, as shown in FIG. 5, the feedback voltage F/B of the capacitor C2 is discharged earlier than the output terminal voltage of the capacitor C1 in the off-section, and therefore no more power is consumed in the first and second reference resistors R1 and R2 and the bias resistor R3.

According to an exemplary embodiment, the blocking diode D2 shuts off the current flowing from the output side of the power supply 100 to the constant-voltage controller 150, and the power consumption is decreased in the off-section, thereby having an effect on reducing the standby power.

Further, the standby power required in the system 100 is stably supplied by the first smoothing capacitor C1, and the minimum capacitance for operations of the constant-voltage controller 150 is applied to the second smoothing capacitor C2 so that the capacitor C2 can be early discharged, thereby minimizing the standby power consumed in the off-section.

Accordingly, the power supply, according to an exemplary embodiment, or the electronic apparatus including the same, substantially accomplishes the standby power of 0.00 W (zero watt), and thus satisfies regulating the power for an energy saving policy.

Although one or more exemplary embodiments have been shown and described, it should be appreciated by those skilled in the art that changes may be made in the exemplary embodiments without departing from the principles and spirit of the inventive concepts, the scope of which is defined in the appended claims and their equivalents.

What is claimed is:

1. An electronic apparatus comprising:
   a power supply comprising:
      a switch configured to perform a switching operation in accordance with a preset period,
      a transformer configured to supply a voltage from a primary side of the transformer to a secondary side of the transformer in response to the switching operation, and
      a constant-voltage controller configured to control a voltage supplied to the electronic apparatus by regulating the voltage at the secondary side of the transformer,
   wherein the constant-voltage controller comprises a first smoothing capacitor and a second smoothing capacitor connected in sequence from an output of the power supply and configured to be charged with a voltage in an on state of the switch, and a blocking diode interposed between the first smoothing capacitor and the second smoothing capacitor and configured to block current flowing from the first smoothing capacitor to the constant-voltage controller so that the voltage charged in the first smoothing capacitor is not supplied to components of the constant-voltage controller in an off state of the switch, and
   wherein an anode of the blocking diode is connected to the second smoothing capacitor, a cathode of the blocking diode is connected to the first smoothing capacitor, and a capacitance of the second smoothing capacitor connected to the anode of the blocking diode is smaller than a capacitance of the first smoothing capacitor.

2. The electronic apparatus according to claim 1, wherein the second smoothing capacitor is configured to be discharged in the off state of the switch regardless of a switching period.

3. The electronic apparatus according to claim 1, wherein the constant-voltage controller is configured to feedback the voltage at the secondary side of the transformer to the primary side of the transformer in the on state of the switch.

4. The electronic apparatus according to claim 3, wherein the constant-voltage controller comprises a voltage regulator configured to regulate the voltage at the secondary side of the transformer, a first reference resistor and a second reference resistor configured to compare voltages of the voltage regulator, a bias resistor configured to apply current to the voltage regulator, a photo-coupler configured to supply the voltage regulated by the voltage regulator to the primary side of the transformer, and the blocking diode is configured to block the voltage charged in the first smoothing capacitor from being provided to the voltage regulator, the first reference resistor, the second reference resistor, the bias resistor and the photo-coupler.

5. A power control method of an electronic apparatus which comprises a power supply for providing power to the electronic apparatus, the method comprising:
   switching a switch of the power supply in accordance with a preset switching period;
   supplying a voltage from a primary side of a transformer to a secondary side of the transformer;
   regulating a voltage at the secondary side and outputting the regulated voltage to the electronic apparatus; and
   by a blocking diode, blocking current flowing from an output of the power supply to a constant-voltage controller,
   wherein the constant-voltage controller further comprises a first smoothing capacitor and a second smoothing capacitor charged with a voltage in an on-section of the switch, and the blocking diode is interposed in between the first smoothing capacitor and the second smoothing capacitor,
   wherein the blocking comprises preventing the voltage charged in the first smoothing capacitor from being supplied to components of the constant-voltage controller in an off state of the switch, and
   wherein an anode of the blocking diode is connected to the second smoothing capacitor, a cathode of the blocking diode is connected to the first smoothing capacitor, and a capacitance of the second smoothing capacitor connected to the anode of the blocking diode is smaller than a capacitance of the first smoothing capacitor.

6. The method according to claim 5, further comprising feeding back the regulated voltage from the secondary side of the transformer to the primary side of the transformer.

7. The method according to claim 5, further comprising discharging the second smoothing capacitor in the off state of the switch.

8. A power supply comprising:
   a switch configured to perform a switching operation in accordance with a preset period;
   a transformer configured to supply a voltage from a primary side of the transformer to a secondary side of the transformer in response to the switching operation; and
   a constant-voltage controller configured to control a voltage supplied by regulating the voltage at the secondary side of the transformer, and feedback the voltage at the secondary side of the transformer to the primary side of the transformer,
   wherein the constant-voltage controller comprises a first smoothing capacitor configured to be charged with the voltage in an on-section of the switch and provided in an output terminal of the power supply, a blocking diode configured to block current flowing from the first smoothing capacitor to the constant-voltage controller in an off state of the switch, and a second smoothing capacitor in which a voltage supplied to the constant-voltage controller is charged, and
   wherein an anode of the blocking diode is connected to the second smoothing capacitor, a cathode of the blocking diode is connected to the first smoothing capacitor, and a capacitance of the second smoothing capacitor connected to the anode of the blocking diode is smaller than a capacitance of the first smoothing capacitor.

9. The power supply according to claim 8, wherein the second smoothing capacitor is discharged in the off state of the switch regardless of a switching period.

10. The power supply according to claim 8, wherein the constant-voltage controller comprises a voltage regulator configured to regulate the voltage at the secondary side of the transformer, a first reference resistor and a second reference resistor configured to compare voltages of the voltage regulator, a bias resistor configured to apply current to the voltage regulator, a photo-coupler configured to supply the voltage regulated by the voltage regulator to the primary side of the transformer, and
   the blocking diode configured to block the voltage charged in the first smoothing capacitor from being supplied to the voltage regulator, the first reference resistor, the second reference resistor, the bias resistor, and the photo-coupler.

11. The electronic apparatus according to claim 4, wherein the second smoothing capacitor is configured to charge a voltage supplied to the voltage regulator, the first reference resistor, the second reference resistor, the bias resistor, and the photo-coupler in the off state of the switch.

* * * * *